United States Patent
Ensor et al.

(10) Patent No.: US 6,187,366 B1
(45) Date of Patent: Feb. 13, 2001

(54) PROCESSED MEATS CONTAINING A STARCH PRODUCT AND PROCESS OF ADDING THE STARCH PRODUCT TO MEAT

(75) Inventors: Stuart A. Ensor; Charles Ferry; Greg Horn, all of Littleton, CO (US)

(73) Assignee: Penford Corporation, Bellevue, WA (US)

( * ) Notice: Under 35 U.S.C. 154(b), the term of this patent shall be extended for 0 days.

(21) Appl. No.: 09/309,927

(22) Filed: May 11, 1999

Related U.S. Application Data

(60) Provisional application No. 60/088,255, filed on Jun. 5, 1998.

(51) Int. Cl.$^7$ .............................. A23L 4/00; A23L 1/317
(52) U.S. Cl. ........................ 426/641; 426/92; 426/578; 426/646
(58) Field of Search .................................... 426/578, 641, 426/646, 92

(56) References Cited

U.S. PATENT DOCUMENTS

| | | | |
|---|---|---|---|
| 3,505,110 | 4/1970 | Kesler et al. | 127/29 |
| 3,512,993 | 5/1970 | Conley et al. | 99/108 |
| 3,577,407 | 5/1971 | Hjermstad | 260/233.3 |
| 4,452,978 | 6/1984 | Eastman | 536/111 |
| 4,837,314 | 6/1989 | Eastman | 536/111 |
| 5,110,612 | 5/1992 | Quarles et al. | 426/548 |
| 5,294,453 | 3/1994 | Quarles et al. | 426/548 |
| 5,384,150 * | 1/1995 | Heeps | 426/646 |
| 5,468,510 | 11/1995 | Christensen et al. | 426/574 |
| 5,569,481 | 10/1996 | Takeda | 426/574 |
| 5,654,028 | 8/1997 | Christensen et al. | 426/574 |
| 5,676,987 | 10/1997 | Lai | 426/104 |

FOREIGN PATENT DOCUMENTS

| | | |
|---|---|---|
| 53-130447 | 11/1978 | (JP). |
| 55-074765 | 6/1980 | (JP). |
| 94/12054 | 6/1994 | (WO). |
| 96/03891 | 2/1996 | (WO). |
| 96/11587 | 4/1996 | (WO). |

OTHER PUBLICATIONS

Whistler et al. 2nd, Ed, *Starch*, Academic Press, N.Y., pp. 324–332, 1984.*

* cited by examiner

*Primary Examiner*—Helen Pratt
(74) *Attorney, Agent, or Firm*—Marshall, O'Toole, Gerstein, Murray & Borun

(57) ABSTRACT

A processed meat product is provided made up of meat and a crosslinked starch product containing a first crosslinked starch which is a potato or tapioca starch and a second crosslinked starch which is a corn starch wherein the first and second crosslinked starches are present at a ratio of 1:3 to 3:1.

22 Claims, No Drawings

PROCESSED MEATS CONTAINING A STARCH PRODUCT AND PROCESS OF ADDING THE STARCH PRODUCT TO MEAT

This application claims priority on provisional patent application Serial No. 60/088,255 filed Jun. 5, 1998.

BACKGROUND OF THE INVENTION

The present invention relates to meat products generally and in particular to processed meat products containing ingredients which improve the functionality, texture and appearance of the processed meat product. Specifically, the present invention relates to the use of modified starch products which can be incorporated into whole muscle tissue as well as into comminuted meat products.

The use of starch products to improve the functionality of whole muscle tissue meat products is well known to the art. In particular, it is well known to incorporate starches such as corn starch or potato starch into meat products in order to stabilize the inherent and added moisture present in such products. The presence of such starch products will minimize the "weeping" of moisture that can occur during storage of the processed meat products. In addition to stabilizing the water content of the meat products the incorporation of starches can provide improvements in other properties of the meat products including those of texture, slicing ability and appearance.

For example, the incorporation of potato starch is known to contribute to texture, and slicing attributes of whole muscle tissue such as chicken or turkey breasts to which it is added. The incorporation of corn starch is known to provide similar improvements to those provided by potato starch but generally provides superior appearance attributes. In particular, the incorporation of corn starch into whole muscle tissues minimizes or eliminates the appearance of striations that become visible with use of higher levels of potato starch in such whole muscle meat products.

Regulatory authorities have established limitations on the types and amounts of ingredients that can be incorporated into meat products. For example, current U.S. Department of Agriculture regulations permit addition of up to 3.5% by weight dry solids basis starch to cooked meat products which levels are frequently capable of achieving high yields or "pump" levels. Accordingly, when higher allowable levels of currently used starches are incorporated into whole tissue meat products and water and other ingredients are incorporated in the products at higher "pump" levels such as 130 or more (e.g., a pump level of 150 means 50% added ingredients), the appearance and texture properties of the resulting meat product can be adversely affected.

Thus, there remains a desire in the art for improved starch compositions for incorporation into meat products to provide improved functional, textural and appearance properties to the resulting meat product generally, and particularly when the added ingredients are incorporated into the meat products at high levels.

SUMMARY OF THE INVENTION

The present invention provides improved starch compositions for incorporation into processed meat products and improved meat products comprising those starch compositions. As an aspect of the present invention, applicants have observed that separate use of modified (crosslinked) potato or corn starches results in limited improvements in functionality in processed meats over the products of the prior art. While the ability of these starches to stabilize inherent and added moisture in meat products is similar, their contributions to texture, slicing, and appearance attributes differ. The incorporation of crosslinked potato starch into meat products contributes better texture and slicing characteristics, while the incorporation of crosslinked corn starch into processed meat products provides superior appearance attributes such as lack of or masking of starch gel pockets or striations.

The present invention provides improved compositions for incorporation into processed meat products which comprise the combination of a first crosslinked starch selected from the groups consisting of potato and tapioca starches and a second crosslinked starch which is a crosslinked corn starch wherein the first and second crosslinked starches are present at a weight ratio of from about 1:3 to 3:1. According to a preferred aspect of the invention the first crosslinked starch is a potato starch. According to a further preferred aspect of the invention it has been found that the combination of crosslinked corn starch and crosslinked potato starch within the ratios of 1:3 to 3:1 and particularly at a weight ratio of 1:1 provides substantial improvements in functional and appearance properties of processed meat products in which the composition is incorporated compared to incorporation of an individual crosslinked or uncrosslinked starch alone.

A preferred crosslinked corn starch for use according to the invention is corn starch which is characterized by a crosslinking level of from about 25 ppm to 200 ppm with a crosslinking level of from about 40 ppm to 80 ppm being preferred. The "crosslinking level" is based upon dry weight of starch of phosphorus oxychloride added during the crosslinking reaction or its equivalent as produced by other crosslinking reactions. Preferred potato and tapioca starches for use according to the invention are characterized by a crosslinking level of from about 25 ppm to 200 ppm with crosslinking levels of from about 40 ppm to 80 ppm being particularly preferred.

The crosslinked starches used in practice of the invention are crosslinked with any of a variety of agents according to methods well known to the art but are preferably crosslinked with phosphorus oxychloride under alkaline conditions. Sodium trimetaphosphate is useful for crosslinking but reacts more slowly than does phosphorus oxychloride and accordingly substantially more reagent is required to achieve the same level of crosslinking as would be achieved with phosphorus oxychloride. Adipic anhydride is also useful as a crosslinking agent but is less stable than $POCl_3$ or sodium trimetaphosphate. Less preferably, epichlorhydrin may also be used at equivalent levels of crosslinking. A particularly preferred starch for use with the invention is an ungelatinized potato starch crosslinked with phosphorus oxychloride at a concentration of 45–65 ppm ($POCl_3$) (Brabender viscosity of 1200–2000 Brabender units at 3.5% D.S., pH 7·50 $\mu$S/cm conductivity·700 cm-g·75 rpm on a Brabender Amylograph) (Penbind 100, Penwest Foods Co., Englewood Colo.).

Different starches having different levels of crosslinking, and thus exhibiting different viscosities, may be used together in practice of the invention. For example, one modified starch having a crosslinking level of 20 ppm and characterized by a relatively high viscosity may be used in conjunction with another modified starch having a crosslinking level of 100 ppm to yield a blend of modified starches characterized by a crosslinking level and having a viscosity intermediate between those of the two components. Those of skill in the art can match a particular level of crosslinking performance by varying crosslinking reaction conditions.

Modified starches can then be "matched" such as by comparing Brabender viscosity curves. Thus, other starches which are crosslinked at a concentrations too high or too low and thus are inappropriate for use alone in practice of the invention can be used in conjunction with other starches provided that the overall starch component is characterized by a viscosity within the desired range.

A particularly preferred corn starch for use according to the present invention is a hydroxypropylated crosslinked corn starch. White corn starches can be modified to have different levels of hydroxypropylation, a preferred hydoxypropyl corn starch is that having a hydroxypropylation level of from 4% to 7%. Corn starches may be hydroxypropylated by etherification with propylene oxide such as according to the methods disclosed by Kesler, U.S. Pat. No. 3,505,110, Hermstad, U.S. Pat. No. 3,577,407; Eastman, U.S. Pat. No. 4,452,978 and Eastman U.S. Pat. No. 4,837,314 the disclosures of which are hereby incorporated by reference. Propylene oxide reacts monofunctionally with starch hydroxyl groups to introduce hydroxypropyl groups into the starch, the hydroxyl groups being attached to the second carbon of the propyl chain rather than to the terminal carbon as is the case with hydroxyethyl substituted starch. The propylene oxide that does not react with the starch converts to propylene glycol or other non-toxic by-products which can be safely removed from the final product. A particularly preferred starch is a crosslinked, oxidized dent corn starch having 4.8% hydroxypropylation which is commercially available as B990 (Grain Products Company).

The method of the invention may be used with any of a variety of processed meat products derived from meat of diverse animal and fish species including but not limited to poultry, beef, pork and fish. While the method of the invention can be used with any type of processed meat product including comminuted meat products, the advantages provided by the methods of the invention are particularly apparent when the processed meat product is whole muscle tissue. In particular, the methods of the invention are particularly useful when the whole muscle tissue treated with the method is that of poultry such as chicken or turkey breast. When used to treat such tissues the compositions of the invention will provide improvements in visible appearance, texture, sliceability, bite and juiciness compared to use of either corn starch or potato starch alone.

When the meat to be treated is whole muscle tissue the compositions of the invention may be administered by a variety of conventional means known to the art including by addition as a solution or by dry addition. When the compositions are applied as a solution they may be administered by means such as by injection into the whole muscle tissue followed by tumbling and/or massaging. When the compositions of the invention are applied to comminuted meat products they may be distributed by admixture with the comminuted meat product.

DETAILED DESCRIPTION OF THE INVENTION

The present invention provides an improved composition for incorporation into processed meat products which comprise the combination of a first crosslinked starch which is a potato or tapioca starch and a second crosslinked starch which is a corn starch wherein the first and second crosslinked starches are present at a weight ratio of from about 1:3 to 3:1 with a weight ratio of about 1:1 being preferred. According to a preferred aspect of the invention, the crosslinked corn starch is hydroxypropylated. A particularly preferred composition of the invention is the combination of crosslinked hydroxypropylated corn starch and crosslinked potato starch at a ratio of 1:1 by weight which provides substantial improvements in functional and appearance properties of processed meat products in which the composition is incorporated compared to incorporation of either crosslinked or uncrosslinked corn or potato starches separately.

The compositions of the invention for incorporation into the processed meat products further comprise additional ingredients including but not limited to salt, dextrose, phosphates, hydrocolloids and gums such as carrageenan, plant and dairy proteins, colors, flavorings, preservatives and the like.

Other aspects and advantages of the present invention will be understood upon consideration of the following illustrative and comparative examples.

COMPARATIVE EXAMPLE 1

According to this comparative example, baseline evaluations were made of various known starch products for incorporation into turkey breast as an example of a processed meat product. Table 1 below sets out the turkey breast formula used in the examples of practice of the invention and comparative examples set out below. The formula of Table 1 is for a 150% pump i.e., wherein the solution comprising the food starches and additional ingredients such as salt, dextrose and phosphate is incorporated into the turkey breast at a quantity which is 50% of the original weight of the turkey breast meat.

The tested starches included crosslinked (45 ppm) potato starch (Penbind 100, Penford Food Ingredients Co.); crosslinked (80 ppm) hydroxypropylated (4.5%) potato starch (Penbind 1000, Penford Food Ingredients); crosslinked hydroxypropylated (4.5%) waxy corn starch (Consista, A. E. Staley); crosslinked hydroxypropylated (6.4%) waxy corn starch (Firmtex, National Starch); crosslinked hydroxypropylated (5.5%) waxy corn starch (PolarGel 18, Cerestar); crosslinked hydroxypropylated (4.8%) oxidized dent corn (B990, Grain Products Co); crosslinked (80 ppm) hydroxypropylated (4.5%) oxidized (0.8% $Cl_2$) potato (Oxidized Penbind 1000, Penford Food Ingredients); and crosslinked (60 ppm) hydroxypropylated (4.5%) oxidized (0.8% $Cl_2$) dent corn. (Lab prepared corn starch).

According to practice of this example, the ingredients listed in Table 1 were combined as follows: first, the quantity of sodium phosphate was slowly added to the quantity of water in a running pickle mixer (Caframo Stirrer Type RZRI). The remaining solid ingredients were then slowly added to form the solutions. The solutions were then transferred to the reservoir of a hand operated Presto brine pump meat injector. The injection needle head held five needles 1⅛ inch apart and each ⅛ inch needle had 16 holes of 1mm diameter. Turkey breasts were then injected with the solution to 150% of their green weight. The exterior surface of the breast muscle was then scored approximately ¾ inch deep, the injected breasts were placed in a vacuum tumbler (Lyco Tumbler, Model 40), and a 25 mm vacuum was pulled on the tumbling vessel. The turkey breasts injected with the starch solutions were then tumbled at 20.5 RPM (50% maximum speed) for one hour. The massaged turkey breasts were then placed in vacuum bags, vacumized and sealed and the bags were shrunk in hot water at 190° F. The turkey breasts were then steamed cooked to an internal temperature of 162° F. and chilled to 40° F. or less within 20 hours.

The processed turkey breasts were then evaluated for yield, texture, appearance (the presence of starch striations) and sliceability according to the following procedures. Yields were measured by comparison of the drained, rinsed and dried weight of the finished product compared to the original (green) meat weight. Texture was measured quantitatively by measurement of the peak force required to puncture the treated breasts using a SMS model TA-XT2 texture analyzer with a puncture probe. (Texture and other results with the same alphabetic designation (e.g., a, b, or c) are not statistically different. Sliceability was evaluated by thin slicing of the breast meat and determination of the presence of partial slices, ragged edges, holes within the slices and the like. The sensory score was based on evaluation of the presence and degree of starch striations resulting from the accumulation of starch in voids within the processed meat product. Scores based on these evaluations of sliceability and sensory were assigned with 1 being the best and 5 being the worst with the results shown in Table 2. The results presented in Table 2 generally show that turkey breast made with crosslinked potato starch (PB100) exhibited excellent texture and sliceability attributes while product made with crosslinked corn starch (B990) had good visual appearance but poor texture.

TABLE 1

Turkey Breast Formula (150% Pump)

| FORMULA: | Pounds | % | % |
|---|---|---|---|
| Turkey Breast Meat | 100.00 | 66.66 | |
| Water | 42.15 | 28.11 | 84.30 |
| Modified Food Starch | 4.50 | 3.00 | 9.00 |
| Salt | 1.80 | 1.20 | 3.60 |
| Dextrose | 1.05 | 0.70 | 2.10 |
| Sodium Phosphate (Brifisol 512) | 0.50 | 0.33 | 1.00 |
| Total | 150.00 | 100.00 | 100.00 |

INVENTION EXAMPLE 1

According to this example, the methods of Comparative Example No. 1 were carried out to compare processed meat products treated with single starch compositions with those treated with the combination crosslinked potato starch/crosslinked hydroxypropylated corn starch compositions of the invention. The starches tested included crosslinked (45 ppm) potato starch (Penbind 100, Penford Food Ingredients Co); crosslinked (80 ppm) hydroxypropylated (4.5%) potato starch (Penbind 1000, Penford Food Ingredients Co.); crosslinked hydroxypropylated (6.4%) waxy corn starch (Firmtex, National Starch); crosslinked hydroxypropylated (4.8%) oxidized dent corn (B990, Grain Products Co.); a crosslinked (60 ppm) hydroxypropylated (4.5%) oxidized (0.8% Cl$_2$) corn (lab prepared starch); crosslinked (800ppm) tapioca starch (PB 150, Penford Food Ingredients Co.); 4.5% hydroxypropylated potato starch (PB 1500, Penford Food Ingredients Co.); a crosslinked, hydroxypropylated (6.4%) small granule potato starch; and a crosslinked (80 ppm), hydroxypropylated (1.5%) waxy potato starch.

The resulting processed meat products were evaluated as follows. Texture was measure both quantitatively and qualitatively. The qualitative evaluation relied upon organoleptic methods wherein the product was cut in half and one half was sliced in the conventional deli manner. The slices were then eaten and evaluated for bite, rubbery texture, flavor and mouthfeel juiciness). There were no statistically significant differences between samples for flavor, bite and juiciness but there were statistically significant differences with respect to yield, sliceability, quantitative texture, appearance and qualitative texture evaluations as presented in Tables 3a–3e.

The results of these tests are presented in Tables 3a–3e with the products placed in rank order and grouped into statistical groups by designation with the letters a through e. Results with the same alphabetic designation are not statistically different. The results presented in Tables 3a–3e show that the compositions comprising blends of crosslinked potato starch with crosslinked hydroxypropylated corn starch provided overall superior products with respect to

TABLE 2

Comparative Example No. 1

| Starch | Yields % | Texture | Sliceability | Appearance Score | Sensory Comments |
|---|---|---|---|---|---|
| Crosslinked (45 ppm) Potato PB 100) | 134.08% | 908.92 a | 2.15 | 3.0 | good bite/surface texture-best of all (not slick/slimy), good meaty texture & flavor |
| Crosslinked (80 ppm) HP(4.5%) Potato (PB 1000) | 134.05% | 485.66 b | 2.75 | 4.0 | slick, gel like texture |
| Crosslinked HP (4.5%) Waxy Corn (Consista) | 134.91% | 503.07 b | 2.25 | 4.0 | slick, gel like texture, strong off flavor |
| Crosslinked HP (6.4%) Waxy Corn (Firmtex) | 133.13% | 388.43 bc | 2.50 | 1.5 | slick, gel like texture |
| Crosslinked HP (5.5%) Waxy Corn (PolarGel 18) | 134.20% | 335.56 c | 3.40 | 3.5 | slick, gel like texture |
| Crosslinked HP (4.8%) Oxidized Dent Corn (B990) | 136.13% | 482.66 b | 3.85 | 1.0 | more slick than the crosslinked potato starch (PB100) but less slick than the other products listed; more fragile than waxy corn (i.e. less flexible when slice is pulled, slice fragments) |
| Crosslinked (80 ppm) HP (4.5%) Oxidized (0.8% <1) Potato (O × PB1000) | 131.43% | 413.27 bc | 2.05 | 4.5 | slick, gel like texture |
| Crosslinked (60 ppm) HP (4.5%) Oxidized (0.8% <1) Dent Corn | 135.58% | 501.35 b | 2.25 | 3.0 | slick, gel like texture | aggregate results for sliceability, texture and appearance compared to compositions comprising either crosslinked potato starch or crosslinked, hydroxypropylated corn starch alone. For example, while processed meats containing the composition comprising crosslinked hydroxypropylated waxy corn starch (Firmtex) had the highest score for yield (which was statistically insignificant from the results obtained by use of the same starch combined at a 50:50 ratio with a crosslinked potato starch) the quantitative analysis and appearance analysis for those compositions were significantly inferior to those obtained by the combination of crosslinked potato and crosslinked, hydroxypropylated corn starches. Similarly, while the processed meat product treated with crosslinked (45 ppm) potato starch (Penbind 100) had the highest resistance in the test for quantitative texture analysis, and performed well with respect to sensory evaluation and texture, the use of that product provided among the poorest yield and sliceability results. In terms of overall performance the composition with a 50/50 blend of crosslinked (45 ppm) potato starch and crosslinked HP (4.8%) oxidized dent corn (B990) had the best aggregate performance.

TABLE 3a

Yields (Average Green to Finish % Yields)

| | | % | Stat. Group(s) |
|---|---|---|---|
| E | Crosslinked HP (6.4%) Waxy Corn (Firmtex) | 139.40 | a |
| C | 50/50 Blend Crosslinked (45 ppm Potato (PB 100)/Crosslinked HP (6.4%) Waxy Corn (Firmtex) | 137.74 | a, b |
| F | Crosslinked HP (45 ppm) Potato (PB 1000) | 136.92 | a, b, c |
| G | Crosslinked (80 ppm) hydroxypropylated (1.5%) waxy potato | 136.61 | a, b, c |
| A | 50/50 Blend Crosslinked (45 ppm) Potato (PB 100/Crosslinked HP (4.8%) Oxidized Dent Corn (B990) | 135.82 | a, b, c |
| B | 50/50 Blend (Crosslinked Potato (PB 100)/Crosslinked (45 ppm) (PB 1500) | 134.27 | a, b, c |
| H | Crosslinked HP (4.8%) Oxidized Dent Corn (B990) | 132.78 | b, c, d |
| I | Crosslinked (45 ppm) Potato (PB 100) | 132.12 | c, d |
| D | 50/50 Blend Crosslinked (45 ppm) Potato (PB 100)/Crosslinked (800 ppm), tapioca (PB 150) | 127.37 | d, e |
| J | Crosslinked, hydroxypropylated (6.4%) small granule potato starch | 124.06 | e |

TABLE 3b

Sliceability

| | | Score | Stat. Group(s) |
|---|---|---|---|
| D | 50/50 Blend Crosslinked (45 ppm) Potato (PB 100)/Crosslinked (800 ppm), tapioca (PB 150) | 1.88 | a |
| A | 50/50 Blend Crosslinked (45 ppm) Potato (PB 100/Crosslinked HP (4.8%) Oxidized Dent Corn (B990) | 1.90 | a |
| G | Crosslinked (80 ppm) hydroxypropylated (1.5%) waxy potato | 1.93 | a |
| F | Crosslinked HP (45 ppm) Potato (PB 1000) | 1.97 | a |
| C | 50/50 Blend Crosslinked (45 ppm Potato (PB 100)/Crosslinked HP (6.4%) Waxy Corn (Firmtex) | 2.32 | |
| B | 50/50 Blend (Crosslinked Potato (PB 100)/Crosslinked (45 ppm) (PB 1500) | 2.68 | a, b |
| E | Crosslinked HP (6.4%) Waxy Corn (Firmtex) | 2.73 | a, b |
| H | Crosslinked HP (4.8%) Oxidized Dent Corn (B990) | 2.83 | a, b |

TABLE 3b-continued

Sliceability

| | | Score | Stat. Group(s) |
|---|---|---|---|
| I | Crosslinked (45 ppm) Potato (PB 100) | 2.87 | a, b |
| J | Crosslinked, hydroxypropylated (6.4%) small granule potato starch | 3.47 | b |

TABLE 3c

Quantitative Texture Analysis

| | | Score | Stat. Group(s) |
|---|---|---|---|
| I | Crosslinked (45 ppm) Potato (PB 100) | 893.5 | a |
| D | 50/50 Blend Crosslinked (45 ppm) Potato (PB 100)/Crosslinked (800 ppm), tapioca (PB 150) | 748.1 | b |
| G | Crosslinked (80 ppm) hydroxypropylated (1.5%) waxy potato | 547.8 | c |
| J | Crosslinked, hydroxypropylated (6.4%) small granule potato starch | 542.8 | c |
| B | 50/50 Blend (Crosslinked Potato (PB 100)/Crosslinked (45 ppm) (PB 1500) | 516.8 | c, d |
| A | 50/50 Blend Crosslinked (45 ppm) Potato (PB 100/Crosslinked HP (4.8%) Oxidized Dent Corn (B990) | 461.8 | c, d |
| F | Crosslinked HP (45 ppm) Potato (PB 1000) | 461.4 | c, d |
| E | Crosslinked HP (6.4%) Waxy Corn (Firmtex) | 393/3 | d |
| H | Crosslinked HP (4.8%) Oxidized Dent Corn (B990) | 392.2 | d |
| C | 50/50 Blend Crosslinked (45 ppm Potato (PB 100)/Crosslinked HP (6.4%) Waxy Corn (Firmtex) | 383.8 | d |

TABLE 3d

Sensory Evaluation Results

| | | Score | Stat. Group(s) |
|---|---|---|---|
| A | 50/50 Blend Crosslinked (45 ppm) Potato (PB 100/Crosslinked HP (4.8%) Oxidized Dent Corn (B990) | 8.3 | a |
| D | 50/50 Blend Crosslinked (45 ppm) Potato (PB 100)/Crosslinked (800 ppm), tapioca (PB 150) | 7.6 | a, b |
| H | Crosslinked HP (4.8%) Oxidized Dent Corn (B990) | 6.6 | b, c |
| I | Crosslinked (45 ppm) Potato (PB 100) | 6.1 | b, c |
| C | 50/50 Blend Crosslinked (45 ppm Potato (PB 100)/Crosslinked HP (6.4%) Waxy Corn (Firmtex) | 5.4 | c, d |
| B | 50/50 Blend (Crosslinked Potato (PB 100)/Crosslinked (45 ppm) (PB 1500) | 4.3 | d, e |
| J | Crosslinked, hydroxypropylated (6.4%) small granule potato starch | 3.9 | d, e |
| E | Crosslinked HP 6.4%) Waxy Corn (Firmtex) | 3.7 | d, e |
| G | Crosslinked (80 ppm) hydroxypropylated (1.5%) waxy potato | 3.7 | e |
| F | Crosslinked HP (45 ppm) Potato (PB 1000) | 3.1 | e |

TABLE 3e

Texture

| | | Score | Stat. Group(s) |
|---|---|---|---|
| A | 50/50 Blend Crosslinked (45 ppm) Potato (PB 100/Crosslinked HP (4.8%) Oxidized | 6.5 | a |

TABLE 3e-continued

Texture

| | | Score | Stat. Group(s) |
|---|---|---|---|
| | Dent Corn (B990) | | |
| I | Crosslinked (45 ppm) Potato (PB 100) | 6.1 | a, b |
| D | 50/50 Blend Crosslinked (45 ppm) Potato (PB 100)/Crosslinked (800 ppm), tapioca (PB 150) | 6.0 | a, b |
| C | 50/50 Blend Crosslinked (45 ppm Potato PB 100)/Crosslinked HP (6.4%) Waxy Corn (Firmtex) | 5.0 | a, b, c |
| B | 50/50 Blend (Crosslinked Potato (PB 100)/Crosslinked (45 ppm) (PB 1500) | 4.9 | a, b, c |
| J | Crosslinked, hydroxypropylated (6.4%) small granule potato starch | 4.8 | a, b, c |
| H | Crosslinked HP (4.8%) Oxidized Dent Corn (B990) | 4.3 | b, c |
| F | Crosslinked HP (45 ppm) Potato (PB 1000) | 4.0 | c |
| G | Crosslinked (80 ppm) hydroxypropylated (1.5%) waxy potato | 3.9 | c |
| E | Crosslinked HP (6.4%) Waxy Corn (Firmtex) | 3.6 | c |

INVENTION EXAMPLE 2

According to this example, the methods of Invention Example 1 above were practiced with blends of crosslinked (45 ppm) potato starch (Penbind 100) and crosslinked hydroxypropylated 4.8% dent corn starch (B990, Grain Products Co.) at various ratios. The results of these tests are presented in Tables 4a–4g with the products placed in rank order and ranked into statistical groups. Results with the same alphabetic designation are not statistically different. The results presented in Tables 4a–4g show that the 50:50 blends of crosslinked potato starch with crosslinked hydroxypropylated corn starch provided overall superior products with respect to aggregate results for yields, texture and appearance compared to either 25:75 or 75:25 blends of those compositions.

TABLE 4a

Yields

| | | Yield | Stat. Group(s) |
|---|---|---|---|
| E | HP Oxidized Dent Corn | 139.32% | a |
| H | 25/75 Blend Crosslinked Potato (PB 100)/HP Oxidized Dent Corn | 137.37% | a, b |
| C | Crosslinked Potato (PB 100) | 137.27% | a, b |
| B | 50/50 Blend Crosslinked Potato (PB 100)/HP Oxidized Dent Corn | 136.82% | a, b |
| I | 75/25 Blend Crosslinked Potato (PB 100)/HP Oxidized Dent Corn | 136.54% | b |
| D | HP Oxidized Dent Corn (B990) | 136.07% | b |
| A | 50/50 Blend Crosslinked Potato PB 100/HP Oxidized Dent Corn (B990) | 135.71% | b |
| G | 75/25 Blend Crosslinked Potato PB 100/HP Oxidized Dent Corn (B990) | 135.26% | b |
| F | 25/75 Blend Crosslinked Potato PB 100/HP Oxidized Dent Corn (B990) | 134.79% | b |
| J | No Starch Control | 126.76% | c |

TABLE 4b

Sliceability

| | | Score | Stat. Group(s) |
|---|---|---|---|
| F | 25/75 Blend Crosslinked Potato PB 100/HP Oxidized Dent Corn (B990) | 3.05 | a |
| G | 75/25 Blend Crosslinked Potato PB 100/HP Oxidized Dent Corn (B990) | 3.08 | a |
| A | 50/50 Blend Crosslinked Potato PB 100/HP Oxidized Dent Corn (B990) | 3.43 | a, b |
| D | HP Oxidized Dent Corn (B990) | 3.47 | a, b |
| I | 75/25 Blend Crosslinked Potato (PB 100)/HP Oxidized Dent Corn | 3.53 | a, b, c |
| B | 50/50 Blend Crosslinked Potato (PB 100)/HP Oxidized Dent Corn | 3.73 | a, b, c |
| J | No Starch Control | 3.73 | a, b, c |
| H | 25/75 Blend Crosslinked Potato (PB 100)/HP Oxidized Dent Corn | 3.80 | a, b, c |
| E | HP Oxidized Dent Corn | 4.22 | b |
| C | Crosslinked Potato (PB 100) | 4.42 | c |

TABLE 4c

Quantitative Texture Analysis

| | | Score | Stat. Group(s) |
|---|---|---|---|
| J | No Starch Control | 837.2 | a |
| C | Crosslinked Potato (PB 100) | 826.0 | a |
| G | 75/25 Blend Crosslinked Potato PB 100/HP Oxidized Dent Corn (B990) | 707.6 | b |
| I | 75/25 Blend Crosslinked Potato (PB 100)/HP Oxidized Dent Corn | 635.2 | b, c |
| F | 25/75 Blend Crosslinked Potato PB 100/HP Oxidized Dent Corn (B990) | 574.8 | c, d |
| H | 25/75 Blend Crosslinked Potato (PB 100)/HP Oxidized Dent Corn | 550.7 | c, d |
| A | 50/50 Blend Crosslinked Potato PB 100/HP Oxidized Dent Corn (B990) | 531.6 | c, d |
| B | 50/50 Blend Crosslinked Potato (PB 100)/HP Oxidized Dent Corn | 519.2 | d |
| D | HP Oxidized Dent Corn (B990) | 500.6 | d |
| E | HP Oxidized Dent Corn | 483.1 | d |

Sensory Evaluation Results: All samples were evaluated for visual appearance, flavor, bite, juiciness & texture. There were no statistical significant differences in the flavors. Results of the statistical work on the other attributes are as follows:

TABLE 4d

Texture

| | | Score | Stat. Group(s) |
|---|---|---|---|
| J | No Starch Control | 6.47 | a |
| A | 50/50 Blend Crosslinked Potato PB 100/HP Oxidized Dent Corn (B990) | 5.83 | a, b |
| G | 75/25 Blend Crosslinked Potato PB 100/HP Oxidized Dent Corn (B990) | 5.73 | a, b |
| B | 50/50 Blend Crosslinked Potato (PB 100)/HP Oxidized Dent Corn | 5.65 | a, b |
| D | HP Oxidized Dent Corn (B990) | 5.42 | a, b |
| C | Crosslinked Potato (PB 100) | 5.35 | a, b |
| H | 25/75 Blend Crosslinked Potato (PB 100)/HP Oxidized Dent Corn | 5.28 | a, b |
| I | 75/25 Blend Crosslinked Potato (PB 100)/HP Oxidized Dent Corn | 5.22 | a, b |
| E | HP Oxidized Dent Corn | 5.18 | a, b |
| F | 25/75 Blend Crosslinked Potato PB 100/HP Oxidized Dent Corn (B990) | 4.98 | b |

TABLE 4e

Bite

| | | Score | Stat. Group(s) |
|---|---|---|---|
| J | No Starch Control | 6.68 | a |
| A | 50/50 Blend Crosslinked Potato PB 100/HP Oxidized Dent Corn (B990) | 6.15 | a, b |
| G | 75/25 Blend Crosslinked Potato PB 100/HP Oxidized Dent Corn (B990) | 6.07 | a, b |
| B | 50/50 Blend Crosslinked Potato (PB 100)/HP Oxidized Dent Corn | 6.00 | a, b |
| I | 75/25 Blend Crosslinked Potato (PB 100)/HP Oxidized Dent Corn | 5.60 | a, b |
| C | Crosslinked Potato (PB 100) | 5.42 | b |
| H | 25/75 Blend Crosslinked Potato (PB 100)/HP Oxidized Dent Corn | 5.37 | b |
| D | HP Oxidized Dent Corn (B990) | 5.32 | b |
| E | HP Oxidized Dent Corn | 5.27 | b |
| F | 25/75 Blend Crosslinked Potato PB 100/HP Oxidized Dent Corn (B990) | 4.95 | b |

TABLE 4f

Juiciness

| | | Score | Stat. Group(s) |
|---|---|---|---|
| F | 25/75 Blend Crosslinked Potato PB 100/HP Oxidized Dent Corn (B990) | 6.48 | a |
| D | HP Oxidized Dent Corn (B990) | 6.37 | a |
| E | HP Oxidized Dent Corn | 5.88 | a, b |
| A | 50/50 Blend Crosslinked Potato PB 100/HP Oxidized Dent Corn (B990) | 5.42 | a, b |
| H | 25/75 Blend Crosslinked Potato (PB 100)/HP Oxidized Dent Corn | 5.32 | a, b |
| G | 75/25 Blend Crosslinked Potato PB 100/HP Oxidized Dent Corn (B990) | 5.17 | a, b |
| B | 50/50 Blend Crosslinked Potato (PB 100)/HP Oxidized Dent Corn | 5.15 | a, b |
| I | 75/25 Blend Crosslinked Potato (PB 100)/HP Oxidized Dent Corn | 4.95 | a, b |
| J | No Starch Control | 4.92 | a, b |
| C | Crosslinked Potato (PB 100) | 4.60 | b |

TABLE 4g

Visual

| | | Score | Stat. Group(s) |
|---|---|---|---|
| J | No Starch Control | 7.93 | a |
| A | 50/50 Blend Crosslinked Potato PB 100/HP Oxidized Dent Corn (B990) | 7.42 | a |
| F | 25/75 Blend Crosslinked Potato PB 100/HP Oxidized Dent Corn (B990) | 6.87 | a, b |
| D | HP Oxidized Dent Corn (B990) | 6.77 | a, b |
| G | 75/25 Blend Crosslinked Potato PB 100/HP Oxidized Dent Corn (B990) | 6.42 | a, b |
| H | 25/75 Blend Crosslinked Potato (PB 100)/HP Oxidized Dent Corn | 5.30 | b |
| C | Crosslinked Potato (PB 100) | 5.18 | b |
| I | 75/25 Blend Crosslinked Potato (PB 100)/HP Oxidized Dent Corn | 5.08 | b |
| E | HP Oxidized Dent Corn | 4.83 | b |
| B | 50/50 Blend Crosslinked Potato (PB 100)/HP Oxidized Dent Corn | 5.50 | b |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A processed meat product comprising meat and a crosslinked starch composition comprising a first crosslinked starch product which is selected from the group consisting of potato starch and tapioca starch; and a second crosslinked starch which is a corn starch wherein said crosslinked first and second starches are present at a ratio of from about 1:3 to 3:1.

2. The processed meat product of claim 1 wherein said second crosslinked starch is a hydroxypropylated corn starch.

3. The processed meat product of claim 1 wherein said crosslinked corn starch is characterized by a crosslinking level of from about 25 ppm to 200 ppm.

4. The processed meat product of claim 1 wherein said crosslinked corn starch is characterized by a crosslinking level of from about 40 ppm to 80 ppm.

5. The processed meat product of claim 1 wherein said first crosslinked starch is characterized by a crosslinking level of from about 25 ppm to 200 ppm.

6. The processed meat product of claim 1 wherein said first crosslinked starch is characterized by a crosslinking level of from about 40 ppm to 80 ppm.

7. The processed meat product of claim 1 wherein said first crosslinked starch is a potato starch.

8. The processed meat product of claim 1 wherein said meat is selected from the group consisting of poultry, beef, pork and fish.

9. The processed meat product of claim 1 wherein said meat is whole muscle tissue.

10. The processed meat product of claim 1 wherein said meat product is a comminuted meat product.

11. A method of preparing a processed meat product comprising the steps of providing meat and distributing throughout said meat a crosslinked starch composition comprising a first crosslinked starch product which is selected from the group consisting of potato starch and tapioca starch; and a second crosslinked starch which is corn starch wherein said crosslinked first and second starches are present at a ratio of from about 1:3 to 3:1.

12. The method of claim 11 wherein said second crosslinked starch is a hydroxypropylated corn starch.

13. The method of claim 11 wherein said crosslinked corn starch is characterized by a crosslinking level of from about 25 ppm to 200 ppm.

14. The method of claim 11 wherein said crosslinked corn starch is characterized by a crosslinking level of from about 40 ppm to 80 ppm.

15. The method of claim 11 wherein said first crosslinked starch is characterized by a crosslinking level of from about 25 ppm to 200 ppm.

16. The method of claim 11 wherein said first crosslinked starch is characterized by a crosslinking level of from about 40 ppm to 80 ppm.

17. The method of claim 11 wherein said first crosslinked starch is potato starch.

18. The method of claim 11 wherein said meat is selected from the group consisting of poultry, beef, pork and fish.

19. The method of claim 11 wherein said meat is whole muscle tissue.

20. The method of claim 18 wherein said crosslinked starch composition is distributed by injection into the whole muscle tissue.

21. The method of claim 11 wherein said processed meat product is a comminuted meat product.

22. The method of claim 21 wherein said crosslinked starch composition is distributed by admixture with said comminuted meat product.

* * * * *